United States Patent
Lin et al.

(10) Patent No.: US 11,438,561 B2
(45) Date of Patent: Sep. 6, 2022

(54) PROJECTION DEVICE AND PERSONALIZED IMAGE SETTING METHOD THEREOF

(71) Applicant: Coretronic Corporation, Hsin-Chu (TW)

(72) Inventors: Ming-Cheng Lin, Hsin-Chu (TW); Yu-Meng Chen, Hsin-Chu (TW); Wei-Hsin Kan, Hsin-Chu (TW); Jiun-Tsang Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 369 days.

(21) Appl. No.: 16/554,610

(22) Filed: Aug. 28, 2019

(65) Prior Publication Data

US 2020/0077062 A1 Mar. 5, 2020

(30) Foreign Application Priority Data

Aug. 30, 2018 (CN) .......................... 201811000953.2

(51) Int. Cl.
*G06T 3/40* (2006.01)
*H04N 9/31* (2006.01)

(52) U.S. Cl.
CPC ............. *H04N 9/3188* (2013.01); *G06T 3/40* (2013.01)

(58) Field of Classification Search
CPC .. G06F 9/45558; G06F 3/038; G06F 3/03547; G06F 1/163; G06F 3/0325;

(Continued)

(56) References Cited

U.S. PATENT DOCUMENTS

| 2006/0080543 A1 | 4/2006 | Yen et al. |
| 2012/0169931 A1 | 7/2012 | Mohapatra |

(Continued)

FOREIGN PATENT DOCUMENTS

| CN | 101426106 | 5/2009 |
| CN | 101640772 | 2/2010 |

(Continued)

OTHER PUBLICATIONS

"Office Action of China Counterpart Application", dated May 14, 2021, pp. 1-10.

(Continued)

*Primary Examiner* — Phuoc H Doan
(74) *Attorney, Agent, or Firm* — JCIPRNET

(57) ABSTRACT

A projection device having an information input unit, a storage unit, a scaling unit, an image processing unit and a projection unit is provided. The information input unit receives the image file corresponded to a compressed personalized startup image file. The storage unit has a first storage block storing a preset startup image file and a second storage block. The scaling unit generates a projected image signal according to the compressed personalized startup image file, and the scaling unit stores the compressed personalized startup image file in the at least one second storage block. The image processing unit generates a projection control signal according to the projected image signal. The projection unit generates an image beam according to the projection control signal, and projects the image beam on a projection surface to form the startup image screen. The disclosure further provides a personalized startup image setting method.

16 Claims, 4 Drawing Sheets

(58) Field of Classification Search
CPC ..... H04W 4/006; H04W 88/02; H04W 4/023; H04N 9/3188; G06T 3/40
USPC .................................. 382/285, 298; 380/54
See application file for complete search history.

(56) References Cited

U.S. PATENT DOCUMENTS

2013/0207943 A1    8/2013  Imai et al.
2016/0021412 A1*   1/2016  Zito, Jr. ............... H04N 21/488
                                                      725/13

FOREIGN PATENT DOCUMENTS

| | | |
|---|---|---|
| CN | 103544048 | 1/2014 |
| CN | 105957130 | 9/2016 |
| CN | 101330583 | 12/2018 |
| TW | 200622858 | 7/2006 |

OTHER PUBLICATIONS

"Search Report of Europe Counterpart Application", dated Feb. 6, 2020, pp. 1-16.
"Office Action of China Counterpart Application", dated May 14, 2020, pp. 1-10.
"Office Action of China Counterpart Application", dated Jan. 5, 2022, p. 1-p. 8.

* cited by examiner

PROJECTION DEVICE AND PERSONALIZED IMAGE SETTING METHOD THEREOF

CROSS-REFERENCE TO RELATED APPLICATION

This application claims the priority benefit of China application serial no. 201811000953.2, filed on Aug. 30, 2018. The entirety of the above-mentioned patent application is hereby incorporated by reference herein and made a part of this specification.

BACKGROUND OF THE DISCLOSURE

Field of the Disclosure

The disclosure relates to a display device and a display method, and more particularly to a projection device and a personalized startup image setting display method.

Description of Related Art

In order to enhance the using attachment of a projector by users, the projector now provides the user with the ability to set the startup screen to provide a personalized service. However, in the hardware of the existing projector, it is necessary to perform calculation using a chip with high computing power. In addition, the process of operation is quite cumbersome for the user.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE DISCLOSURE

The disclosure provides a projection device and a personalized startup image setting method thereof, so as to provide a user to set a personalized startup image screen.

In order to achieve one or a part or all of the above or other purposes, an embodiment of the disclosure provides a projection device. The projection device has an information input unit, a storage unit, a scaling unit, an image processing unit, and a projection unit. The information input unit receives an image file corresponded to a compressed personalized startup image file. The storage unit has a first storage block and at least one second storage block, and the first storage block stores a preset startup image file. The scaling unit is connected to the information input unit and the storage unit. The scaling unit generates a projected image signal according to the compressed personalized startup image file, and the scaling unit stores the compressed personalized startup image file in the at least one second storage block. The image processing unit is connected to the scaling unit to generate a projection control signal according to the projected image signal. The projection unit is connected to the image processing unit, and generates an image beam according to the projection control signal, and projects the image beam on a projection surface to form a startup image screen.

In order to achieve one or a part or all of the above or other purposes, an embodiment of the disclosure provides a personalized startup image setting method adapted to a projection device, herein the projection device has a storage unit, and the storage unit has a first storage block and at least one second storage block, and the first storage block stores the preset startup image file. The method includes steps: receiving an image file by the projection device, herein the image file corresponds to a compressed personalized startup image file; and the projection device storing the compressed personalized startup image file in the at least one second storage block.

Based on the above, the projection device and the personalized startup image setting method provided by the disclosure set a plurality of storage blocks in the storage device to store the personalized startup image file. Users may switch between the personalized startup image and the original preset startup image to provide the users with a flexible selection. In addition, the compressed personalized startup image file is transmitted by an electronic device to the projection device as a startup image screen, so that the projection device does not need to additionally convert or extract an analogized digital image of the received personalized startup image, or capture and compress, thereby reducing the burden on the image processing of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising,"

or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
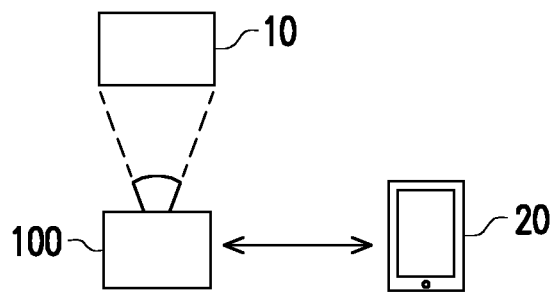
FIG. 1 is a schematic diagram illustrating the application of a projection device according to an embodiment of the disclosure.

FIG. 1 is a schematic diagram illustrating the application of a projection device according to an embodiment of the disclosure. Referring to FIG. 1, in the embodiment of the disclosure, the projection device 100 projects an image beam corresponding to the startup image file, and projects the image beam onto a projection surface 10 to form a startup image screen. The projection surface 10 is, for example, a projection screen or a wall surface.

In addition, the projection device 100 is also connected to an electronic device 20, and receives various information (for example, including image files, etc.) and instructions transmitted by the electronic device 20. In an embodiment of the disclosure, the electronic device 20 is, for example, a portable electronic device having operating ability, such as a smart phone, a wearable electronic device, a tablet computer, a personal digital assistant (PDA), or a notebook computer. However, the disclosure is not limited thereto. The manner in which the projection device 100 is connected to the electronic device 20 can be implemented by wire (e.g. cable) or wireless connection. Furthermore, the "connection" described in the subsequent description can be regarded as a transmission relationship between two units by an electrical signal, and is not limited to a physical contact connection.

Figure 2:
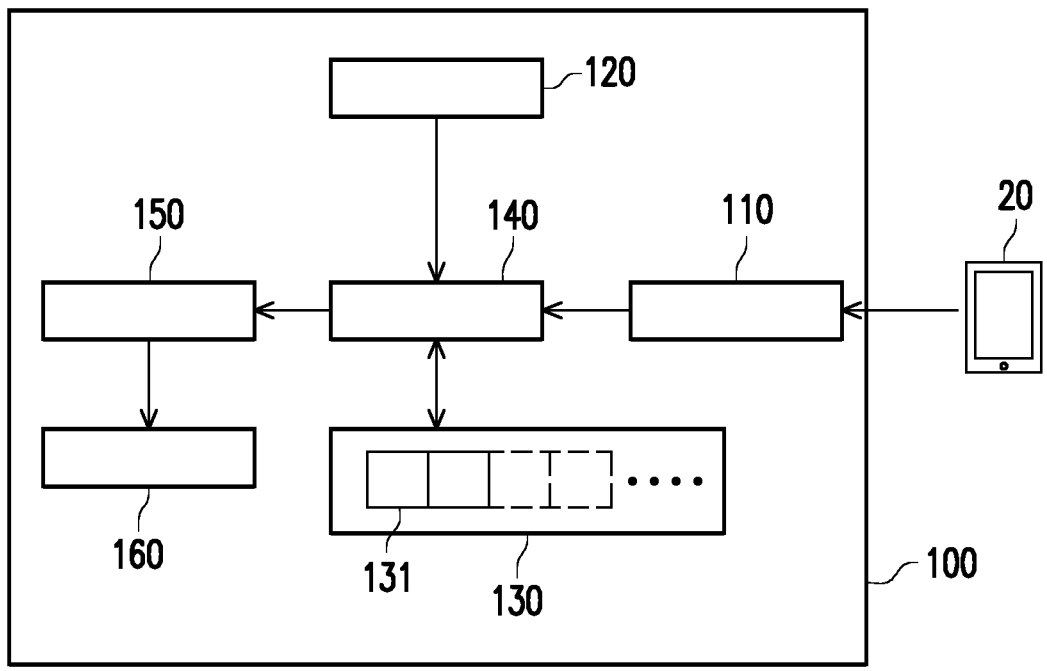
FIG. 2 is a system diagram of a projection device according to an embodiment of the disclosure.

FIG. 2 is a system diagram of a projection device according to an embodiment of the disclosure. Referring to FIG. 2, the projection device 100 includes an information input unit 110, a stream input unit 120, a storage unit 130, a scaling unit 140 (e.g. Scaler), an image processing unit 150, and a projection unit 160.

The information input unit 110 receives image files and instructions transmitted from the electronic device 20. In particular, the information input unit 110 receives the image file transmitted by the electronic device 20, herein the image file includes a compressed personalized startup image, which is defined as a compressed personalized startup image file. The compressed personalized startup image file is stored to the projection device 100. The compressed personalized startup image file will be stored in the projection device 100 and used as the startup image screen. The details of how the compressed personalized startup image file is generated and used as the startup image will be explained later.

In the embodiment of the disclosure, the information input unit 110 is a connection interface for receiving a digital signal, for example, an RS-232 interface, a Universal Serial Bus (USB), a data display channel (Display data channel command interface, DDC/CI), wireless fidelity interface (WiFi), RJ45 interface, etc., but the disclosure is not limited thereto. That is to say, the electronic device 20 may transmit signals and instructions to the information input unit 110 by directly or indirectly corresponding to the communication protocol or interface of the information input unit 110.

The stream input unit 120 is configured to receive a video stream signal. In an embodiment of the disclosure, the stream input unit 120 is, for example, a high definition multimedia interface (HDMI), a VGA terminal (Video Graphics Array connector), a digital visual interface (DVI), An AV terminal (Composite Video Connector), a Component Video Connector, or the like, but the disclosure is not limited thereto.

The storage unit 130 is configured to store program codes or related application software and the like necessary for the operation of the projection device 100. Moreover, the storage unit 130 has many different storage areas. For example, the storage unit 130 includes a startup setting area 131. The startup setting area 131 stores a plurality of startup image files, and in particular, the startup setting area 131 further includes a first storage block and a second storage block. The first storage block stores a preset startup image file. For example, when shipped from a factory, the engineer has previously stored the startup image file beforehand in the first storage block of the startup setting area 131 of the projection device 100, so the projection device 100 will project the preset startup image screen when the projection device 100 is turned on. In addition, the second storage block is used to store the compressed personalized startup image file as a new startup image screen. It should be noted that the startup image files stored in the startup setting area 131 are compressed image files.

In other embodiments of the disclosure, the storage unit 130 may also have a plurality of second storage blocks, that is, the user may store a plurality of different personalized startup image files in different second storage blocks.

In an embodiment of the disclosure, the hardware of the storage unit 130 may be selected from one of the following types of memories: Non-volatile memory (NVM), such as a read-only memory (Read-only memory, ROM), a programmable read-only memory (PROM), an erasable programmable read only memory (EPROM), an electrically erasable programmable read only memory (EEPROM), or a flash memory, and a type of storage device such as a hard disk drive (HDD) and a solid-state drive (SSD), but the disclosure is not limited thereto. Any storage device capable of retaining stored data even when the power is turned off may be applied to the disclosure.

The scaling unit 140 is connected to the information input unit 110, the stream input unit 120, and the storage unit 130. The scaling unit 140 receives the image file transmitted by the information input unit 110 or the video stream signal transmitted by the stream input unit 120, and correspondingly performs image processing on the video stream signal or the image file (the compressed personalized startup image file), for example, compresses, decompresses, or adjusts the resolution to produce the projected image signal. In addition, the scaling unit 140 may store the compressed personalized startup image file in the second storage block of the storage unit 130. Details of an operation of the scaling unit 140 will be described later. The scaling unit 140 is implemented, for example, by using a scaler chip (Scaler IC). The most basic work of a scaling unit (scaling chip) is to re-adjust the images of different resolutions into a projectable image resolution of the projection device. In other words the best resolution of the image that can be projected by the projection device. However, any chip capable of providing the above functions may be applied to the disclosure.

The image processing unit 150 is connected to the scaling unit 140. The image processing unit 150 receives the projected image signal processed by the scaling unit 140 and generates a corresponding projection control signal according to the projected image signal. The image processing unit 150 is, for example, a central processing unit (CPU), a microprocessor (Microprocessor), a digital signal processor (DSP), a programmable controller, or a programmable logic device (Programmable Logic Device, PLD) or other similar devices or combinations of these devices, the disclosure is not limited.

The projection unit 160 is connected to the image processing unit 150, and generates the image beam according to the projection control signal of the image processing unit 150, and projects the image beam onto the projection surface 10 to form the startup image screen. The projection unit 160 is, for example, a device including a digital micromirror device (DMD), a reflective liquid crystal on silicon (LCOS), or a transmissive spatial light modulator such as a Transparent Liquid Crystal Panel, however, the disclosure is not limited thereto.

Figure 3:
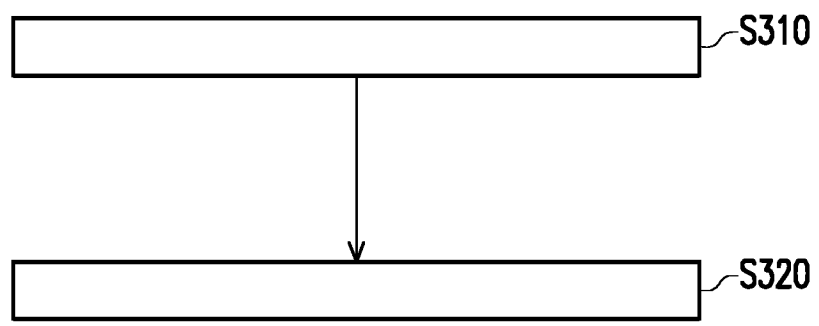
FIG. 3 is a schematic flowchart illustrating a method for setting a personalized startup image according to an embodiment of the disclosure.

FIG. 3 is a schematic flowchart showing a method for setting a personalized startup image according to an embodiment of the disclosure. Referring to FIG. 3, an image projection method of the embodiment is applied to the projection device 100 of FIGS. 1 and 2.

Taking the projection device 100 of FIGS. 1 and 2 as an example, the image file transmitted by the electronic device 20 is received by the information input unit 110 in step S310. In this embodiment, the image file includes a compressed personalized startup image file. The compressed personalized startup image file includes an image that the user wants to use as the startup image screen, this image is a digitally formatted and compressed image.

In detail, in an embodiment of the disclosure, in step S310, the scaling unit 140 receives the compressed personalized startup image file provided from the information input unit 110 when the projection device 100 is in the standby mode or the projection mode. That is to say, in the disclosure, the projection device 100 may set/store the personalized startup image as the startup image screen in a standby mode or a projection mode. Therefore it is not necessary to capture the personalized startup image in the projection mode to set the startup image screen.

In step S320, the compressed personalized startup image file is stored by the scaling unit 140 in the second storage block of the storage unit 130. That is to say, the scaling unit 140 does not replace the preset startup image file originally stored in the first storage block, but further stores the compressed personalized startup image file in the second storage block. Therefore, when the user turns on the projection device 100, the scaling unit 140 may read and decompress the compressed personalized startup image file in the second storage block, and generates a personalized startup image corresponding to the projected image signal of the compressed personalized startup image file. The image beam is projected by the projection unit 160 to form a startup image screen desired by the user.

Figure 4:
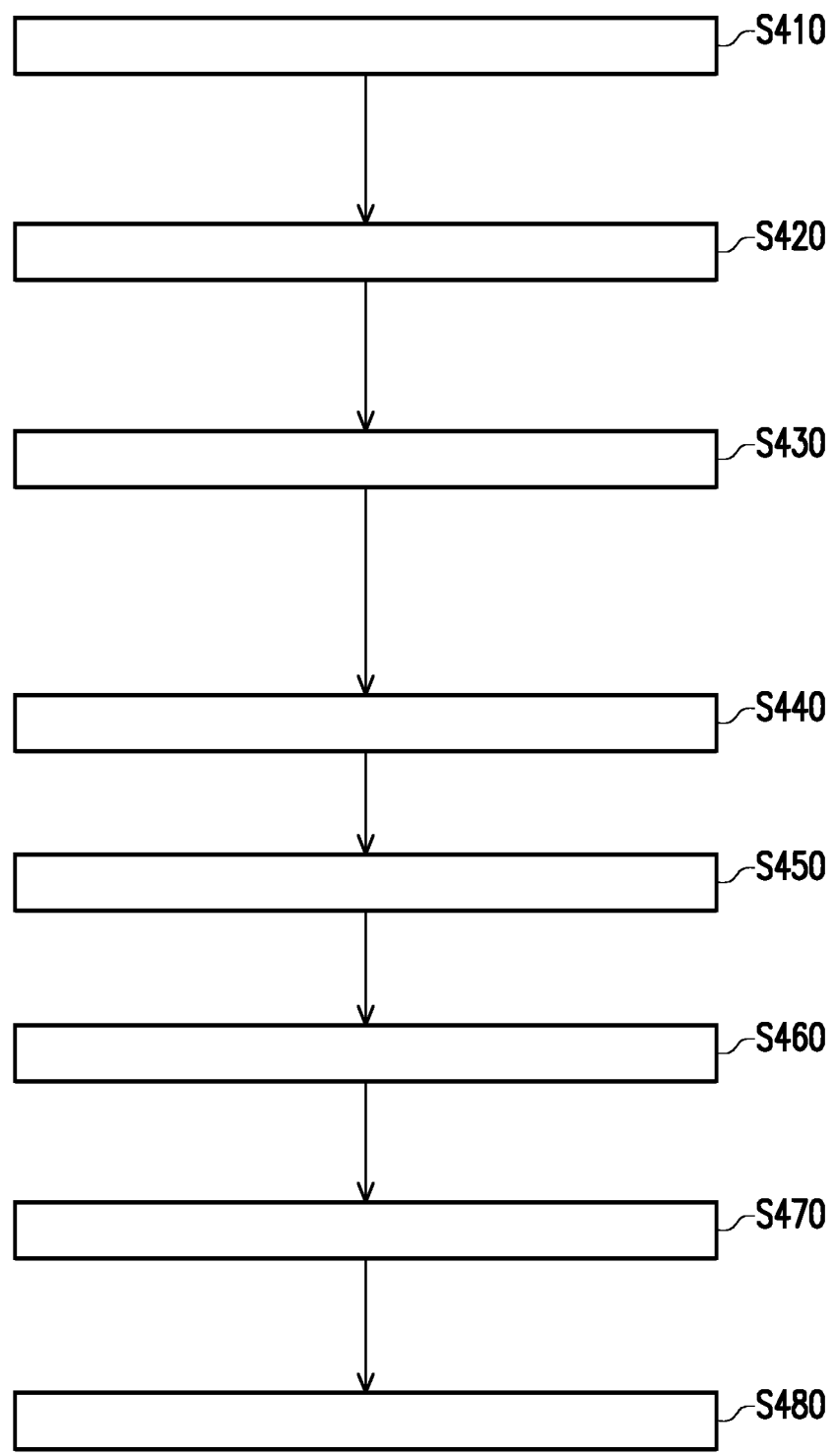
FIG. 4 is a schematic flowchart illustrating the method for setting a personalized startup image according to another embodiment of the disclosure.

FIG. 4 is a schematic flowchart illustrating the method for setting the personalized startup image according to another embodiment of the disclosure. Referring to FIG. 4, the image projection method of the embodiment is applied to the projection device 100 of FIGS. 1 and 2. The case where the projection device 100 interacts with the electronic device 20 will be described below by steps of FIG. 4.

In this embodiment, an application (APP) that cooperates with the projection device 100 is installed on the electronic device 20, so that the user can further enable the projection device 100 to interact with the electronic device 20 through the application (handshake state).

In step S410, the projection device 100 is connected to the electronic device 20 via the information input unit 110. The image file from the electronic device 20 is received by the projection device 100. In an embodiment of the disclosure, the user may use a button interface with "identification of the projection device information" displayed on the display device of the electronic device 20 by the application in the electronic device 20, thereby enabling the electronic device 20 to send out an identification request. However, in other embodiments of the disclosure, a physical button may be disposed on the projection device 100 or by using a display (On Screen Display, OSD) setting menu, the user may press a physical button or select a button in the display setting menu, in turn, enables the projection device 100 to receive the identification request provided by the electronic device 20.

In step S420, the projection device 100 returns a projection device information to the electronic device 20 according to the identification request. In detail, the projection device information is, for example, at least one or a plurality of information such as a chip information of the projection device, an address information of the first storage block, an address information of the second storage block, a resolution information and a size of the second storage block, but the disclosure is not limited thereto. The chip information is, for example, a chip model and version of the projection device. The address information of the first storage block and the address information of the second storage block are used to allow the electronic device 20 to obtain the space in which the preset startup image file can be placed, and the compressed personalized startup image file can be written. The size of the second storage block has an upper limit (for example, 2 MB). The resolution information is the basis for the electronic device 20 to process the personalized startup image. The projection device 100 transmits the projection device information back to the electronic device 20, or if the user sends the identification request through a button or a display setting menu on the projection device 100, then the projection device 100 transmits the projection device information to the electronic device 20 connected to the projection device 100.

In step S430, a selection instruction or an image capture instruction is received by the electronic device 20 to obtain a personalized startup image. Specifically, the user can select on a photo or a picture stored in the electronic device 20 as a personalized startup image by using the application (APP). In other embodiments, by using the application (APP), the user can instantly capture images or pictures displayed on a display device of the electronic device 20 as the personalized startup image.

In step S440, the resolution of the personalized startup image is adjusted by an application of the electronic device 20 according to the projection device information. Specifically, since the application of the electronic device 20 in step S430 further adjusts the resolution of the personalized startup image to be consistent with the resolution acceptable to the projection device. For example, when an optimal resolution supported by the projection device 100 is 1920× 1080, the application of the electronic device 20 adjusts the resolution of the personalized startup image to 1920×1080.

In step S450, the user may enable the electronic device 20 to receive a cropping instruction by the application of the electronic device 20, so that the application of the electronic device 20 crops the personalized startup image according to the cropping instruction. Specifically, in an embodiment of the disclosure, the personalized startup image selected or captured by the user may have unnecessary image content. At this time, the user may operate the application of the electronic device 20 (for example, adjusting a personalized border of the startup image, cropping the personalized startup image, etc.) to issue a crop instruction. The electronic device 20 crops the personalized image according to the cropping instruction. It should be noted that in other embodiments of the disclosure, the user may not issue any cropping instructions if the user is satisfied with the content of the personalized startup image.

In step S460, an adjusted personalized startup image is compressed by the application of the electronic device 20 to generate the compressed personalized startup image file, and the image file is sent to the projection device 100. In detail, in an embodiment of the disclosure, the electronic device 20 generates the compressed personalized startup image file by using a run-length encoding (RLE) compression. In other embodiments, the electronic device 20 may also use an image compression algorithm such as an Entropy encoding or a Lempel-Ziv-Welch (LZW) encoding, the disclosure is not limited thereto. The foregoing various types of image compression algorithms are algorithms known to those skilled in the art, and thus are not described herein. After the electronic device 20 adjusts, crops, and compresses the personalized startup image, the image file (the compressed personalized startup image file) is transmitted to the projection device 100.

It should be noted that, since the compressed personalized startup image is in a digital format, the image formats supported by the projection device 100 are, for example, a .BMP file, a .JPG file, a .PNG file, a .GIF file, a .TIFF file, and the like. The disclosure is not limited thereto.

In step S470, the image file is received by the information input unit 110 of the projection device 100. In step S480, the compressed personalized startup image file is stored by the scaling unit 140 of the projection device 100 in the second storage block of the storage unit 130. Step S470 and step S480 are the same as steps S310 and S320 of FIG. 3, and thus are not described herein.

That is to say, in this embodiment, the compressed personalized startup image is generated by obtaining a personalized startup image in response to receiving the selection instruction or the image capture instruction, adjusting the resolution of the personalized startup image according to the projection device information, cropping the personalized startup image according to the received cropping instruction, and compressing the adjusted personalized startup image by the application of the electronic device 20. Hence, for the projection device 100, a chip having a high computing capability is not necessary for providing the function of setting the personalized startup image screen.

Figure 5:
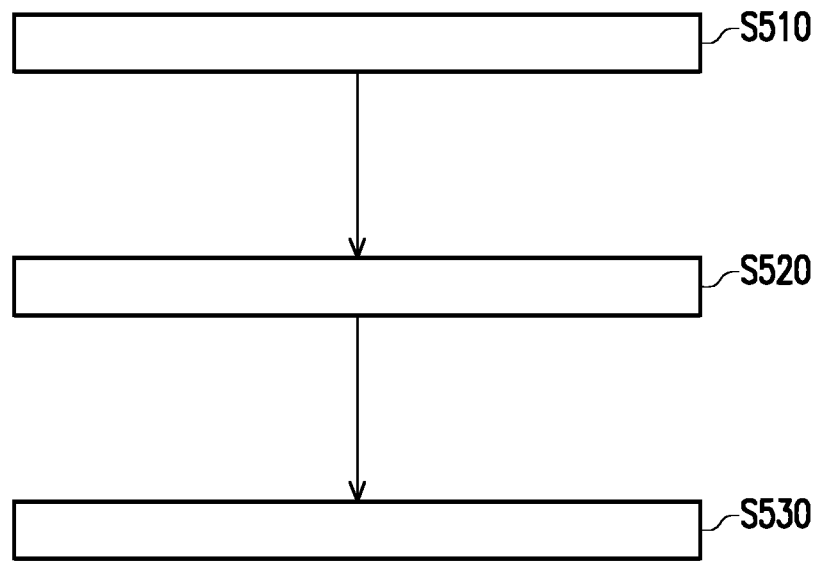
FIG. 5 is a flowchart illustrating the process of reading a personalized startup image according to an embodiment of the disclosure.

FIG. 5 is a flowchart illustrating the process of reading a personalized startup image according to an embodiment of the disclosure. Referring to FIG. 5, the image projection method of the embodiment is applied to the projection device 100 of FIGS. 1 and 2. The manner in which the projection device 100 reads the personalized startup image will be described below with reference to FIG. 5.

In step S510, the scaling unit 140 of the projection device 100 reads the compressed personalized startup image file in the second storage block according to an enable signal. The enable signal is, for example, a signal generated when the user activates the projection device 100 or when the projection device 100 is woken up from a sleep state. The scaling unit 140 reads the startup setting area 131 in the storage unit 130 according to the enable signal, and further reads the compressed personalized startup image file configured as the startup image screen.

In step S520, the compressed personalized startup image file is decompressed by the scaling unit 140 of the projection device 100 to generate the projected image signal according to the decompressed personalized image file. Specifically, in order to save storage space, the compressed personalized startup image file is stored in the storage unit 130 in a compressed state. However, when the projection device 100 is to read the compressed personalized startup image file for projection, the compressed personalized startup image file must be decompressed to further project the personalized startup image screen. Therefore, the scaling unit 140 first decompresses the compressed personalized startup image file to generate the projected image signal. The scaling unit 140 decompresses the compressed personalized startup image file in a corresponding compression manner. For example, as described above, the compressed personalized startup image file is compressed by the run length encoding algorithm, so when decompressing, the scaling unit 140 also uses the run length encoding algorithm to decompress the personalized startup image file. After decompressing the personalized startup image file and generating the projected image signal, the scaling unit 140 further transmits the projected image signal to the image processing unit 150.

In step S530, the image processing unit 150 and the projection unit 160 of the projection device 100 project the image beam onto the projection surface 10. Specifically, when receiving the projected image signal, the image processing unit 150 of the projection device 100 generates a projection control signal according to the projected image signal. The projection unit 160 receives and generates the image beam according to the projection control signal, and then projects the image beam onto the projection surface 10 to form a startup image screen. By steps S510~S530, the personalized startup image screen may be projected onto the projection surface 10 when the projection device 100 is turned on.

It is worth mentioning that, as described above, since the scaling unit 140 does not replace the preset startup image file originally stored in the first storage block, the personalized startup image file is further stored in the second storage block. Therefore, according to the control of the user, the projection device 100 may reads the personalized startup image file or reads the preset startup image file as the startup image screen.

Figure 6:
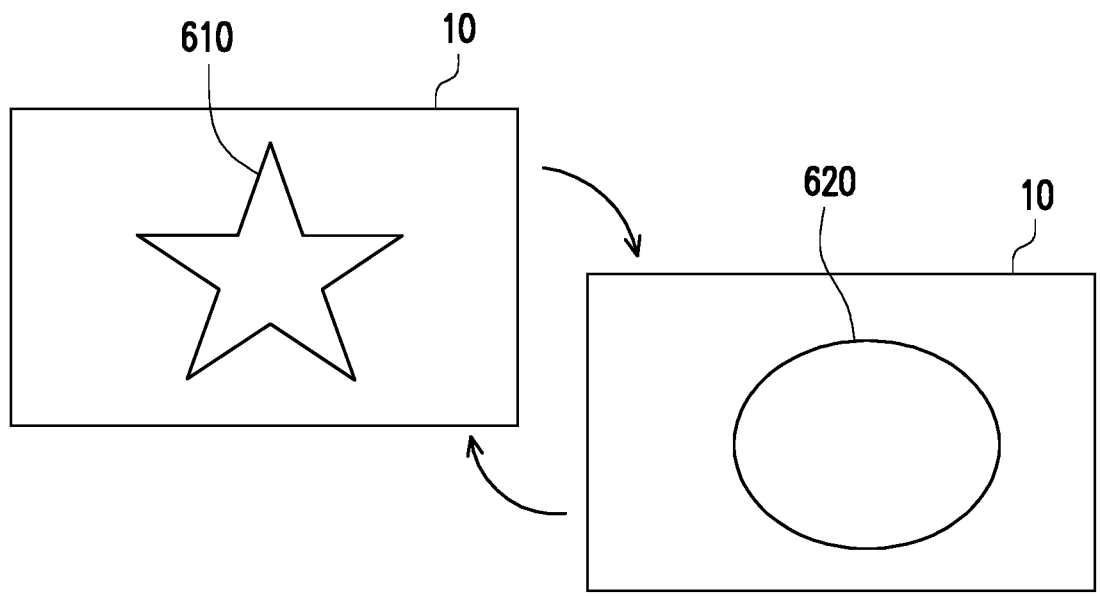
FIG. 6 is a schematic diagram illustrating switching of a startup image screen according to an embodiment of the disclosure.

FIG. 6 is a schematic diagram illustrating switching of a startup image screen according to an embodiment of the disclosure. Referring to FIG. 6, in particular, by using a startup image switching button in the application in the electronic device 20, or by pressing a physical button or a projected setting menu set by the projection device 100, the user may generate an image switching instruction that enables the startup image screen to switch from the personalized startup image screen 620 to the preset startup image screen 610.

The scaling unit 140 reads the preset startup image file in the first storage block according to the image switching instruction. The scaling unit 140 decompresses the preset startup image file to generate the projected image signal according to the decompressed preset startup image file, so that the projection unit 160 projects the image beam onto the projection surface 10 to form a preset startup image screen 610. Therefore, the user may repeatedly input the image switching instruction, and enabling the startup image screen on the projection surface 10 to switch between the personalized startup image screen 620 and the preset startup image screen 610.

Figure 7:
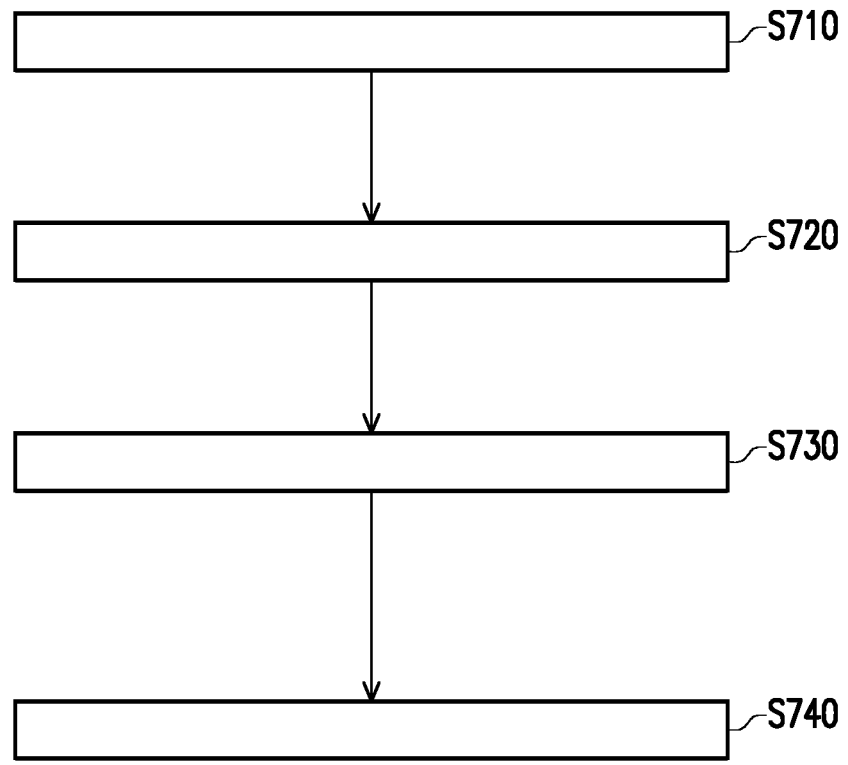
FIG. 7 is a flowchart illustrating a method for setting a personalized startup image according to another embodiment of the disclosure.

FIG. 7 is a flowchart illustrating a method for setting a personalized startup image according to another embodiment of the disclosure. Referring to FIG. 7, the image projection method of the embodiment is applied to the projection device 100 of FIGS. 1 and 2.

Taking the projection device 100 of FIGS. 1 and 2 as an example, in step S710, the stream input unit 120 receives the video stream signal transmitted by the video output device (not shown). The image output device is, for example, the same device as the electronic device 20 for providing a video. The video stream signal includes a video file, and the video stream signal may be an analog format or a digital format. In this embodiment, when the user projects the video through the projection device 100, the user may press a physical button disposed on the projection device 100 or select a button in the display setting menu (On Screen Display, OSD), to pause playback of the projection device 100 and display a still image accordingly. At this time, the video stream signal corresponding to the still image is transmitted to the scaling unit 140 by the stream input unit 120.

In step S720, the scaling unit 140 captures the video stream signal corresponding to the still image to form a personalized startup image file.

In step S730, the scaling unit 140 compresses the personalized startup image file to form the compressed personalized startup image file. The projection device 100 of the disclosure generates the compressed personalized startup image file by using the run-length encoding (RLE) compression. However, in other embodiments, an image compression algorithm such as the Entropy encoding or the Lempel-Ziv-Welch (LZW) encoding may be used, and the disclosure is not limited thereto. The foregoing various types of image compression algorithms are algorithms known to those skilled in the art, and thus are not described herein.

In step S740, the scaling unit 140 writes and stores the compressed personalized startup image file into the second storage block of the storage unit 130.

Figure 8:
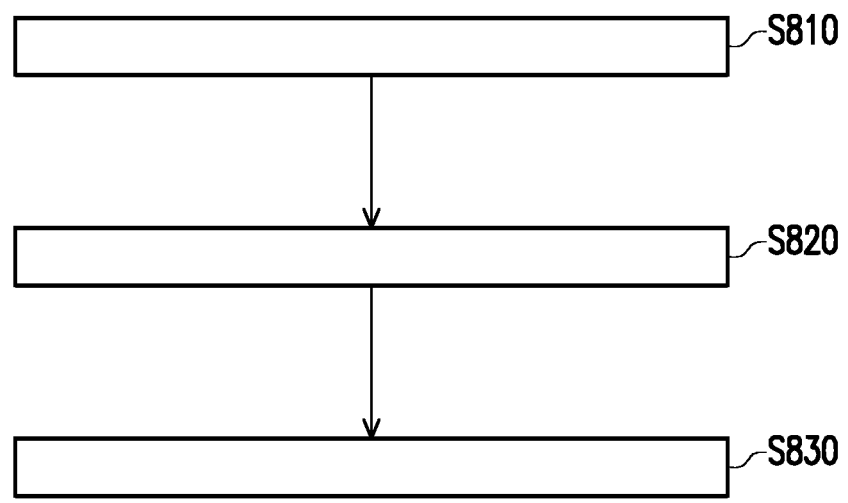
FIG. 8 is a flowchart illustrating the process of reading a personalized startup image according to another embodiment of the disclosure.

FIG. 8 is a flowchart illustrating the process of reading a personalized startup image according to another embodiment of the disclosure.

In step S810, the scaling unit 140 of the projection device 100 reads the compressed personalized startup image file in the second storage block according to the enable signal. The enable signal is, for example, a signal generated when the user activates the projection device 100 or when the projection device 100 is woken up from a sleep state. The scaling unit 140 reads the startup setting area 131 in the storage unit 130 according to the enable signal, and further reads the compressed personalized startup image file configured as the startup image screen.

In step S820, the compressed personalized startup image file is decompressed by the scaling unit 140 of the projection device 100 to generate the projected image signal according to the decompressed personalized image file. Specifically, in order to save storage space, the compressed personalized startup image file is stored in the storage unit 130 in the compressed state. However, when the projection device 100 is to read the compressed personalized startup image file for projection, the compressed personalized startup image file must be decompressed to further project the personalized startup image screen. Therefore, the scaling unit 140 first decompresses the compressed personalized startup image file to generate the projected image signal. The scaling unit 140 decompresses the compressed personalized startup image file in a corresponding compression manner. For example, as described above, the compressed personalized startup image file is compressed by the run length encoding algorithm, so when decompressing, the scaling unit 140 also uses the run length encoding algorithm to decompress the personalized startup image file. After decompressing the personalized startup image file and generating the projected image signal, the scaling unit 140 further transmits the projected image signal to the image processing unit 150.

In step S830, the image processing unit 150 and the projection unit 160 of the projection device 100 project the image beam onto the projection surface 10. Specifically, when receiving the projected image signal, the image processing unit 150 of the projection device 100 generates a projection control signal according to the projected image signal. The projection unit 160 receives and generates the image beam according to the projection control signal, and then projects the image beam onto the projection surface 10 to form the startup image screen. By step S810~S830, the personalized startup image screen can be projected onto the projection surface 10 when the projection device 100 is turned on.

It is worth mentioning that, as described above, since the scaling unit 140 does not replace the preset startup image file originally stored in the first storage block, the personalized startup image file is further stored in the second storage block. Therefore, when the startup device file is read, the projection device 100 can not only read the personalized startup image file, but also read the preset startup image file as the startup image screen according to the user's control.

In summary, the projection device and the personalized startup image setting method provided by the disclosure set a plurality of storage blocks in the storage device to store the personalized startup image file. The user may switch between the personalized startup image and the original preset startup image to provide the user with a flexible selection. In addition, the compressed personalized startup image file is transmitted from the electronic device to the projection device as the startup image screen, which reduces the burden on the image processing device of the projection device. Furthermore, the personalized startup image setting method not only be performed in the projection mode, but also be performed in the standby mode or the projection mode.

Moreover, for the projection device, a chip with high computing ability is no longer necessary for providing the function of setting the startup image screen.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
an information input unit, configured to receive an image file, wherein the image file corresponds to a compressed personalized startup image file;
a storage unit, comprising a first storage block and at least one second storage block, wherein the first storage block is configured to store a preset startup image file;
a scaling unit, connected to the information input unit and the storage unit, wherein the scaling unit is configured to generate a projected image signal according to the compressed personalized startup image file, the scaling unit is configured to store the compressed personalized startup image file to the at least one second storage block, the scaling unit is configured to read the compressed personalized startup image file in the second storage block according to an enable signal, and the scaling unit is configured to decompress the compressed personalized startup image file to generate the projected image signal according to the decompressed personalized startup image file;
an image processing unit, connected to the scaling unit, and configured to generate a projection control signal according to the projected image signal; and
a projection unit, connected to the image processing unit, and configured to generate an image beam according to the projection control signal and project the image beam on a projection surface to form a startup image screen.

2. The projection device of claim 1, wherein
the information input unit is connected to an electronic device,
the scaling unit is configured to receive an identification request from the electronic device by the information input unit and return a projection device information to the electronic device according to the identification request,
wherein the projection device information includes a chip information, an address information of the first storage block, an address information of the at least one second storage block, a resolution information, and a size of the second storage block.

3. The projection device of claim 2, wherein
the electronic device is configured to receive a selection instruction or an image capturing instruction to obtain the personalized startup image, and a resolution of the personalized startup image is adjusted by the electronic device according to the projection device information.

4. The projection device of claim 3, wherein the personalized startup image is further cropped by the electronic device according to a cropping instruction received.

5. The projection device of claim 3, wherein the personalized startup image is compressed by the electronic device according to a run-length encoding algorithm to generate the compressed personalized startup image file.

6. The projection device of claim 1, wherein
the scaling unit is configured to read the preset startup image file in the first storage block according to an image switching instruction,
the scaling unit further is configured to decompress the preset startup image file to generate the projected image signal according to the decompressed preset startup image file.

7. A projection device, comprising:
an information input unit, configured to receive an image file, wherein the image file corresponds to a compressed personalized startup image file;
a storage unit, comprising a first storage block and at least one second storage block, wherein the first storage block is configured to store a preset startup image file;
a scaling unit, connected to the information input unit and the storage unit, wherein the scaling unit is configured to generate a projected image signal according to the compressed personalized startup image file, and the scaling unit is configured to store the compressed personalized startup image file to the at least one second storage block;
an image processing unit, connected to the scaling unit, and configured to generate a projection control signal according to the projected image signal; and
a projection unit, connected to the image processing unit, and configured to generate an image beam according to the projection control signal and project the image beam on a projection surface to form a startup image screen,
wherein the scaling unit is in a standby mode or a projection mode when the information input unit receives the image file.

8. A projection device, comprising:
an information input unit, configured to receive an image file, wherein the image file corresponds to a compressed personalized startup image file;
a storage unit, comprising a first storage block and at least one second storage block, wherein the first storage block is configured to store a preset startup image file;
a scaling unit, connected to the information input unit and the storage unit, wherein the scaling unit is configured to generate a projected image signal according to the compressed personalized startup image file, and the scaling unit is configured to store the compressed personalized startup image file to the at least one second storage block;
an image processing unit, connected to the scaling unit, and configured to generate a projection control signal according to the projected image signal;
a projection unit, connected to the image processing unit, and configured to generate an image beam according to the projection control signal and project the image beam on a projection surface to form a startup image screen; and
a stream input unit, configured to receive a video stream signal, wherein the scaling unit is connected to the stream input unit, and the scaling unit is configured to generate the projected image signal according to the video stream signal, the scaling unit is configured to capture part of the video stream signal to form a personalized startup image file, and the scaling unit is configured to compress the personalized startup image file to form the compressed personalized startup file and stores the compressed personalized startup image file in the at least one second storage block.

9. A personalized startup image setting method, adapted for a projection device, wherein the projection device comprises a storage unit, the storage unit comprises a first storage block and at least one second storage block, and the first storage block stores a preset startup image file, and the method comprises:

receiving, by the projection device, an image file, wherein an image file corresponds to a compressed personalized startup image file;

storing, by the projection device, the compressed personalized startup image file in the at least one second storage block;

reading, by the projection device, the compressed personalized startup image file in the second storage block according to an enable signal;

decompressing the compressed personalized startup image file by the projection device to generate a projected image signal according to the decompressed personalized startup image file.

10. The personalized startup image setting method of claim 9, further comprising:

receiving, by the projection device, an identification request from an electronic device;

returning, by the projection device, a projection device information to the electronic device according to the identification request, wherein, the projection device information comprises a chip information, an address information of the first storage block, an address information of the at least one second storage block, a resolution information, and a size of a storage block.

11. The personalized startup image setting method of claim 10, further comprising:

receiving, by the electronic device, a selection instruction or an image capture instruction to obtain the personalized startup image;

adjusting a resolution of the personalized startup image by the electronic device according to the projection device information.

12. The personalized startup image setting method of claim 11, further comprising:

receiving, by the electronic device, a cropping instruction, so as to crop the personalized startup image according to the cropping instruction.

13. The personalized startup image setting method of claim 11, wherein the compressed personalized startup image file is generated by compressing the adjusted personalized startup image by the electronic device according to a run length encoding algorithm.

14. The personalized startup image setting method of claim 9, further comprising:

reading, by the projection device, the preset startup image file in the first storage block according to an image switching instruction;

decompressing the preset startup image file by the projection device to generate the projected image signal according to the decompressed preset startup image file.

15. A personalized startup image setting method, adapted for a projection device, wherein the projection device comprises a storage unit, the storage unit comprises a first storage block and at least one second storage block, and the first storage block stores a preset startup image file, and the method comprises:

receiving, by the projection device, an image file, wherein an image file corresponds to a compressed personalized startup image file, wherein when the image file is received by the projection device, the projection device is in a standby mode or a projection mode; and storing, by the projection device, the compressed personalized startup image file in the at least one second storage block.

16. A personalized startup image setting method, adapted for a projection device, wherein the projection device comprises a storage unit, the storage unit comprises a first storage block and at least one second storage block, and the first storage block stores a preset startup image file, and the method comprises:

receiving, by the projection device, an image file, wherein an image file corresponds to a compressed personalized startup image file;

storing, by the projection device, the compressed personalized startup image file in the at least one second storage block, wherein a video stream signal is received by the projection device, and the projection device generates a projected image signal according to the video stream signal, the projection device captures part of the video stream signal to form a personalized startup image file, and the projection device compresses the personalized startup image file to form the compressed personalized startup image file, thereby storing the compressed personalized startup image file in the at least one second storage block.

\* \* \* \* \*